United States Patent
Srivatsa et al.

(10) Patent No.: US 11,432,129 B2
(45) Date of Patent: Aug. 30, 2022

(54) CLOUD BASED PROXIMITY PAIRING AND SWITCHING FOR PEER-TO-PEER DEVICES

(71) Applicant: Apple Inc., Cupertino, CA (US)

(72) Inventors: Akshay Mangalam Srivatsa, Santa Clara, CA (US); Craig P. Dooley, Los Gatos, CA (US); David John Shaw, Ramona, CA (US); Ganesha Adkasthala Ganapathi Batta, San Jose, CA (US); Michael Jason Giles, San Jose, CA (US); Sriram Hariharan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/232,422

(22) Filed: Apr. 16, 2021

(65) Prior Publication Data

US 2021/0235251 A1    Jul. 29, 2021

Related U.S. Application Data

(63) Continuation of application No. 16/570,308, filed on Sep. 13, 2019, now Pat. No. 10,986,482, which is a
(Continued)

(51) Int. Cl.
*H04W 76/10* (2018.01)
*H04B 7/185* (2006.01)
(Continued)

(52) U.S. Cl.
CPC ............ *H04W 4/80* (2018.02); *H04L 67/104* (2013.01); *H04M 1/72412* (2021.01);
(Continued)

(58) Field of Classification Search
CPC ..... H04W 4/80; H04W 76/02; H04W 76/023; H04W 76/025; H04B 3/544; H04B 7/18558; H04B 2201/71346; H04L 67/104

See application file for complete search history.

(56) References Cited

U.S. PATENT DOCUMENTS

| | | |
|---|---|---|
| 7,424,267 B2 | 9/2008 | Eisenbach |
| 7,912,020 B2 | 3/2011 | Khasawneh et al. |

(Continued)

FOREIGN PATENT DOCUMENTS

| | | |
|---|---|---|
| CN | 101632270 A | 1/2010 |
| CN | 102255896 | 11/2011 |

(Continued)

OTHER PUBLICATIONS

Extended European Search Report for EP Patent Application 21168935.1, dated Jul. 23, 2021.
(Continued)

*Primary Examiner* — Andrew Wendell
(74) *Attorney, Agent, or Firm* — Kowert, Hood, Munyon, Rankin & Goetzel P.C

(57) ABSTRACT

A first wireless communication device (UE device) associated with a certain user (or included in a specified set/group of UE devices) may establish a first communication link with an accessory device according to a short-range radio access technology, and transmit link (pairing) information associated with the first communication link to a server, such as a cloud-based server. The server may share this (first) link information with other UE devices associated with the same user (or belonging to the same specified group of UE devices as the first UE device). Link information associated with the other UE devices (i.e. second link information) may equally be shared with the accessory device, and the other UE devices and accessory device may use the first link infor-
(Continued)

mation and second link information in establishing respective communication links between any of the other UE devices and the accessory device without having to undergo a pairing procedure.

20 Claims, 7 Drawing Sheets

Related U.S. Application Data continuation of application No. 15/911,644, filed on Mar. 5, 2018, now Pat. No. 10,419,912, which is a continuation of application No. 14/871,487, filed on Sep. 30, 2015, now Pat. No. 9,913,079.

(60) Provisional application No. 62/171,844, filed on Jun. 5, 2015.

(51) Int. Cl.
| | | |
|---|---|---|
| *H04W 4/80* | (2018.01) | |
| *H04W 4/08* | (2009.01) | |
| *H04W 76/14* | (2018.01) | |
| *H04M 1/72412* | (2021.01) | |
| *H04W 12/50* | (2021.01) | |
| *H04W 12/04* | (2021.01) | |
| *H04L 67/104* | (2022.01) | |
| *H04W 84/18* | (2009.01) | |

(52) U.S. Cl.
CPC ............. *H04W 4/08* (2013.01); *H04W 12/04* (2013.01); *H04W 12/50* (2021.01); *H04W 76/14* (2018.02); *H04W 84/18* (2013.01)

(56) References Cited

U.S. PATENT DOCUMENTS

| | | | |
|---|---|---|---|
| 8,429,421 B2 | 4/2013 | Chase | |
| 8,769,612 B2 | 7/2014 | Ganapathy | |
| 9,480,096 B1 * | 10/2016 | Lee | ..................... H04W 12/065 |
| 9,913,079 B2 | 3/2018 | Srivatsa | |
| 10,048,497 B1 * | 8/2018 | Ran | ..................... G02B 27/017 |
| 10,419,912 B2 | 9/2019 | Srivatsa | |
| 2003/0105812 A1 | 6/2003 | Flowers et al. | |
| 2005/0071481 A1 | 3/2005 | Danieli | |
| 2009/0061769 A1 | 3/2009 | Zimbric et al. | |
| 2009/0081999 A1 | 3/2009 | Khasawneh et al. | |
| 2012/0322376 A1 | 12/2012 | Couse | |
| 2013/0012119 A1 | 1/2013 | Ma et al. | |
| 2013/0072119 A1 | 3/2013 | Park | |
| 2013/0288604 A1 | 10/2013 | Chang | |
| 2013/0311562 A1 | 11/2013 | Platt et al. | |
| 2013/0311692 A1 | 11/2013 | Huang | |
| 2013/0311694 A1 | 11/2013 | Bhamidipati et al. | |
| 2014/0094124 A1 | 4/2014 | Dave et al. | |
| 2014/0160033 A1 | 6/2014 | Brikman et al. | |
| 2014/0229105 A1 | 8/2014 | Lee et al. | |
| 2015/0189006 A1 | 7/2015 | Smus et al. | |
| 2016/0119032 A1 * | 4/2016 | Choi | ..................... H04L 67/16 455/41.1 |
| 2016/0128124 A1 | 5/2016 | Liu et al. | |
| 2016/0227319 A1 | 8/2016 | Zhao et al. | |
| 2017/0231022 A1 | 8/2017 | Ito et al. | |

FOREIGN PATENT DOCUMENTS

| | | |
|---|---|---|
| CN | 102461128 A | 5/2012 |
| CN | 102550061 A | 7/2012 |
| CN | 103210383 A | 7/2013 |
| CN | 104145471 A | 11/2014 |
| CN | 104584606 A | 4/2015 |
| CN | 104770055 A | 7/2015 |
| EP | 2615746 | 7/2013 |
| JP | 2013-541886 | 11/2013 |
| TW | M499593 U | 4/2015 |
| TW | M499593 U | 4/2015 |
| WO | 2012044395 | 4/2012 |
| WO | 2012123868 A1 | 9/2012 |
| WO | 2014084707 | 6/2014 |

OTHER PUBLICATIONS

First Office Action for CN Patent Application No. 202110267765.1; dated Nov. 16, 2021.
International Search Report and Written Opinion for International Application No. PCT/US2016/027927, dated Jul. 4, 2016, pp. 1-15.
Office Action, Japanese Patent Application No. 2017-561830, dated Dec. 12, 2018, two pages.
Decision of Grant, Japanese Patent Application No. 2017-561830 dated Jun. 3, 2019, one page.
Office Action, Chinese Application for Invention No. 201680031633. 6, dated Nov. 20, 2019, 22 pages.
Office Action, Indian Application for Invention No. 201717039699, dated May 15, 2020, 6 pages.

* cited by examiner

CLOUD BASED PROXIMITY PAIRING AND SWITCHING FOR PEER-TO-PEER DEVICES

PRIORITY CLAIM

This application is a continuation of U.S. patent application Ser. No. 15/911,644 titled "Cloud Based Proximity Pairing and Switching for Peer-to-Peer Devices" and filed on Mar. 5, 2018, now U.S. Pat. No. 10,419,912, which itself is a continuation of U.S. patent application Ser. No. 14/871,487 titled "Cloud Based Proximity Pairing and Switching for Peer-to-Peer Devices" and filed on Sep. 30, 2015, now U.S. Pat. No. 9,913,079, which claims benefit of priority of U.S. Provisional Patent Application Ser. No. 62/171,844 titled "Cloud-Based Proximity Pairing and Switching for Peer-to-Peer Devices", filed on Jun. 5, 2015, all of which are hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to electronic devices, including establishment of and switching between pairing sessions between an accessory device and two or more electronic devices.

DESCRIPTION OF THE RELATED ART

In recent years electronic devices have become increasingly sophisticated. Electronic devices, including smart phones, smart watches, smart glasses, tablet computers, and notebook computers, are often able to communicate with numerous types of supportive or accessory devices such as keyboards, mice, trackpads, headsets, speakers, remote controllers, videogame controllers, etc. Such accessory devices may support one or more of various communications technologies, including wired and wireless technologies, in order to connect, or pair, with electronic devices. In particular, these devices often utilize short range wireless communication technologies and standards, such as IEEE 802.11 (WLAN or Wi-Fi), or BLUETOOTH™ (BT) or BLUETOOTH™ Low Energy (BTLE), among others.

Short range wireless communication technologies are oftentimes used to establish wireless personal area networks (WPANs). WPANs can be used for communication among the electronic devices themselves (intrapersonal communication), or for connecting to a higher level network and the Internet (an uplink), or for connecting accessory devices with the electronic devices (pairing). Other short range wireless communication technologies used in establishing WPANs include Wireless USB™, INSTEON™, IrDA™, and the like. The reach of a WPAN can vary from a few centimeters to a few meters. One primary concept of WPANs is referred to as "plugging in". For example, when any two WPAN-equipped devices come into close proximity (within several meters of each other), they can establish communications with each other as if they were connected by a cable. Another feature associated with WPAN-enabled devices and/or accessories is the ability of each device/accessory to selectively lock out other devices/accessories, preventing needless interference or unauthorized access to information.

As mentioned above, electronic devices are often capable of pairing with one or more accessory devices, enabling direct peer-to-peer communications between the paired devices. Pairing an accessory device and an electronic device often requires a prescribed procedure and/or actions in order to establish a functioning connection. Therefore, further improvements in the field are desired.

SUMMARY OF THE INVENTION

Embodiments are presented herein of, inter alia, improved systems and methods for sharing an accessory device among multiple electronic devices such that the electronic devices may efficiently transition to and from being paired with the accessory device.

In some scenarios, a user may desire to utilize an accessory device across multiple other electronic devices as necessary. For example, a user may wish to use a BLUETOOTH™ (BT) headset with a mobile phone, e.g. an iPhone™, during one period of time, then use the same headset with a tablet computer (e.g. an iPad™) at another time, and possibly with a wearable electronic device (e.g. an Apple Watch™) at yet another time. However, transitioning an accessory device from being paired with (and thus useable by) a first electronic device to being paired with a second electronic device and a third electronic device (etc.) may present inefficiencies.

In some embodiments, a first user equipment (UE) device associated with a certain user (or included in a specified set/group of UE devices) may establish a first communication link with an accessory device and transmit link (pairing) information associated with this communication link to a server, such as a cloud server. The server may share this (first) link information with other UEs associated with the same user as the first UE (or belonging to the same specified group of UE devices as the first UE device). Link information associated with these other UE devices (i.e. second link information) may equally be shared with the accessory device, and the first link information and second link information may then be useable by the other UE devices and the accessory device in establishing respective communication links between any of the other UE devices and the accessory device.

Some embodiments may be implemented in a device that comprises at least one antenna, one or more radios implementing one or more wireless radio access technologies (e.g., Wi-Fi or Bluetooth), and a processing element coupled to the at least one antenna. The device may communicate with one or more other accessory devices. Note that the techniques described herein may be implemented in and/or used with a number of different types of devices, including but not limited to, computer systems, access points, cellular phones, portable media players, tablet computers, wearable devices, and various other computing devices.

Proximity can be used to prompt pairing of devices through a short range wireless communication protocol, e.g. BLUETOOTH™ (BT) low-energy (BTLE). When several hosts are in the vicinity, the user interface (UI) for proximity pairing may appear only on the host with which the accessory is attempting to pair. Cloud-based proximity pairing/switching helps limit the pairing options for an accessory to a specified or select group of devices, e.g. to a user's iCloud™ registered devices. When an accessory device is paired to one of a set of devices, the accessory, e.g., the BT stack, may send the link information associated with the pairing and the first device to other devices in the set. The link keys and/or other connection information associated with the other devices in the set also may be shared by the currently connected device with the accessory device. That is, link keys and/or other connection information associated with the other devices in the set may also be provided by the currently connected device to the accessory device. When the accessory device is within a particular proximity of another user device from the set of user devices, a disconnect message may be sent, e.g., over the cloud, to the currently connected device, enabling proximity-based switching of the accessory device to another device of the set of devices.

Further to the above, easy pairing between accessory devices and user devices may be performed according to a variety of different scenarios. In a first example, user devices and accessories (or accessory devices) may be connected over a secure transport such as Universal Serial Bus (USB) or secure Wi-Fi and the existing transport may be used for exchanging link information, e.g. security credentials. In a second example, when a short range wireless communications connection, e.g., a BLUETOOTH™ connection, is desired between more than two devices, the device that has a connection with the other two devices may act as a relay to transfer link information, such as BLUETOOTH™ security credentials, over the existing BLUETOOTH™ connections to establish a third connection without having to go through a pairing procedure.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
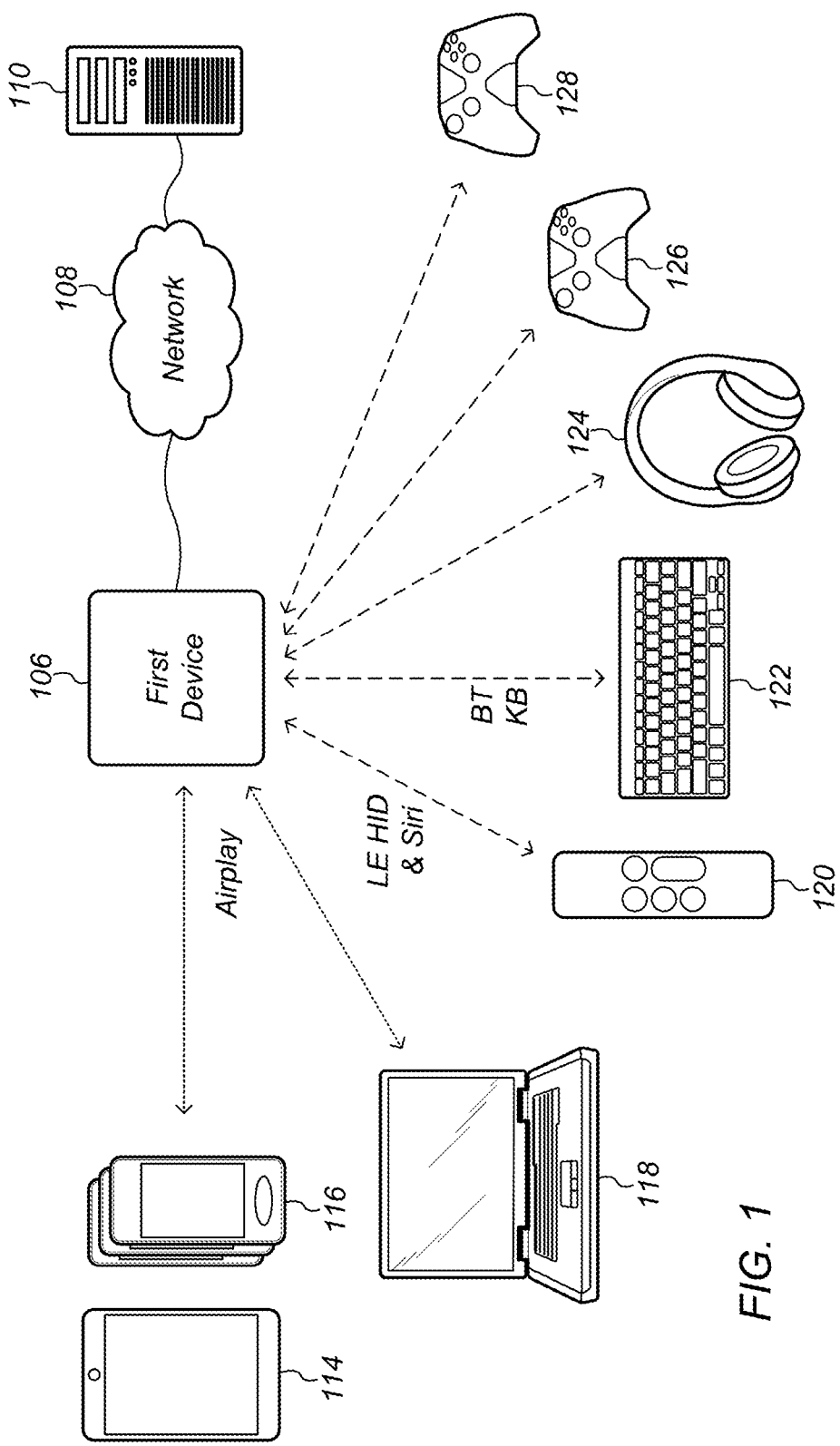
FIG. 1 shows an example wireless communication system in which a first device connects over BLUETOOTH™ and Wi-Fi to various other devices, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:
UE: User Equipment
RF: Radio Frequency
AP: Access Point
BT: Bluetooth
BTLE: Bluetooth Low Energy
BTLEA: Bluetooth Low Energy for Audio
TDD: Time Division Duplexing
TX: Transmission/Transmit
RX: Reception/Receive
LAN: Local Area Network
WLAN: Wireless LAN, also referred to as Wi-Fi
RAT: Radio Access Technology
RSSI: Received Signal Strength Indicator
Wi-Fi: Wireless Local Area Network (WLAN) RAT based on the Institute of Electrical and Electronics Engineers' (IEEE) 802.11 standards Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors and/or processing elements.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Also referred to as wireless communication devices. Examples of UE devices include mobile telephones or smart phones (e.g., iPhone™, Android™-based phones) and tablet computers such as iPad™ Samsung Galaxy™, etc., portable gaming devices (e.g., Nintendo DS™, PlayStation Portable™, Gameboy Advance™, iPod™), laptops, wearable devices (e.g. Apple Watch™, Google Glass™) PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—Example First Device Connecting to BT Devices

FIG. 1 shows an example first device 106 which may be owned by and/or operated by a first user. The first device 106 may selectively connect over a wireless connection such as BLUETOOTH™ (BT) with various devices, such as a tablet computer 114, one or more smart phones 116, a computer 118, a remote control 120, a keyboard 122, a headset or speaker 124, and/or remote game controllers (GC) 126 and 128, etc. In the example shown in FIG. 1, the first device 106 is shown as being possibly connected with a number of BT devices, although the first device 106 may connect to any of various types of devices. In this example embodiment, the first device may be any of various types of devices, such as a computer, tablet, smart phone, wearable device, etc.

The first device 106 is also shown as being connected through a wide area network 108 to a server computer 110. The server computer 110 may store information regarding other devices associated with or owned by the first user, e.g., as indicated by a first user account. For example, the server 110 may be a cloud-based server which stores information regarding other devices owned by the first user. The first device 106 may connect to the server 110 through network 108 over a Wi-Fi network, e.g., through a Wi-Fi access point for an Internet connection. Alternatively, or in addition, the first device 106 may connect to the server 110 through network 108 over a cellular connection. As will be further discussed below, the first device 106 may operate to create a pairing (establish short-range wireless communications) with a wireless device and in the process create and store link information. The link information may include any data, security credentials (e.g. security keys), link keys, long term keys, OOB keys, etc. depending on the short-range wireless communications protocol through which the first device 106 is paired with the wireless device.

The introduction of proximity pairing, as described above, also introduces several challenges, including but not limited to host-host calibration differences, environmental variations, and impact of Wi-Fi when associated with 2.4 GHz networks. There are some host systems that are more susceptible to these factors than other host systems. For example, when there are several hosts in the vicinity, the user interface (UI) for proximity pairing (PP) should be displayed only on the host device for which the pairing is intended, and should not be displayed on any of the other hosts in the vicinity. To alleviate some of these issues, the proximity pairing/switching may be based on limiting the pairing to a specified or selected set of devices. For example, in some embodiments a cloud-based proximity pairing/switching between devices (e.g. between accessory devices and electrical/user devices) may help limit the access to a user's cloud-based devices. This may provide a seamless experience for the user to help use an accessory device with the intended (correct) electronic/user device at the intended time. The first device 106 may then be configured to provide the link information (or other connection information) to the server 110 so that this link information may be shared with other devices associated with or owned by the first user. These other devices may be considered as the specified or selected (set of) devices with which the first device 106 may be paired.

Figure 2:
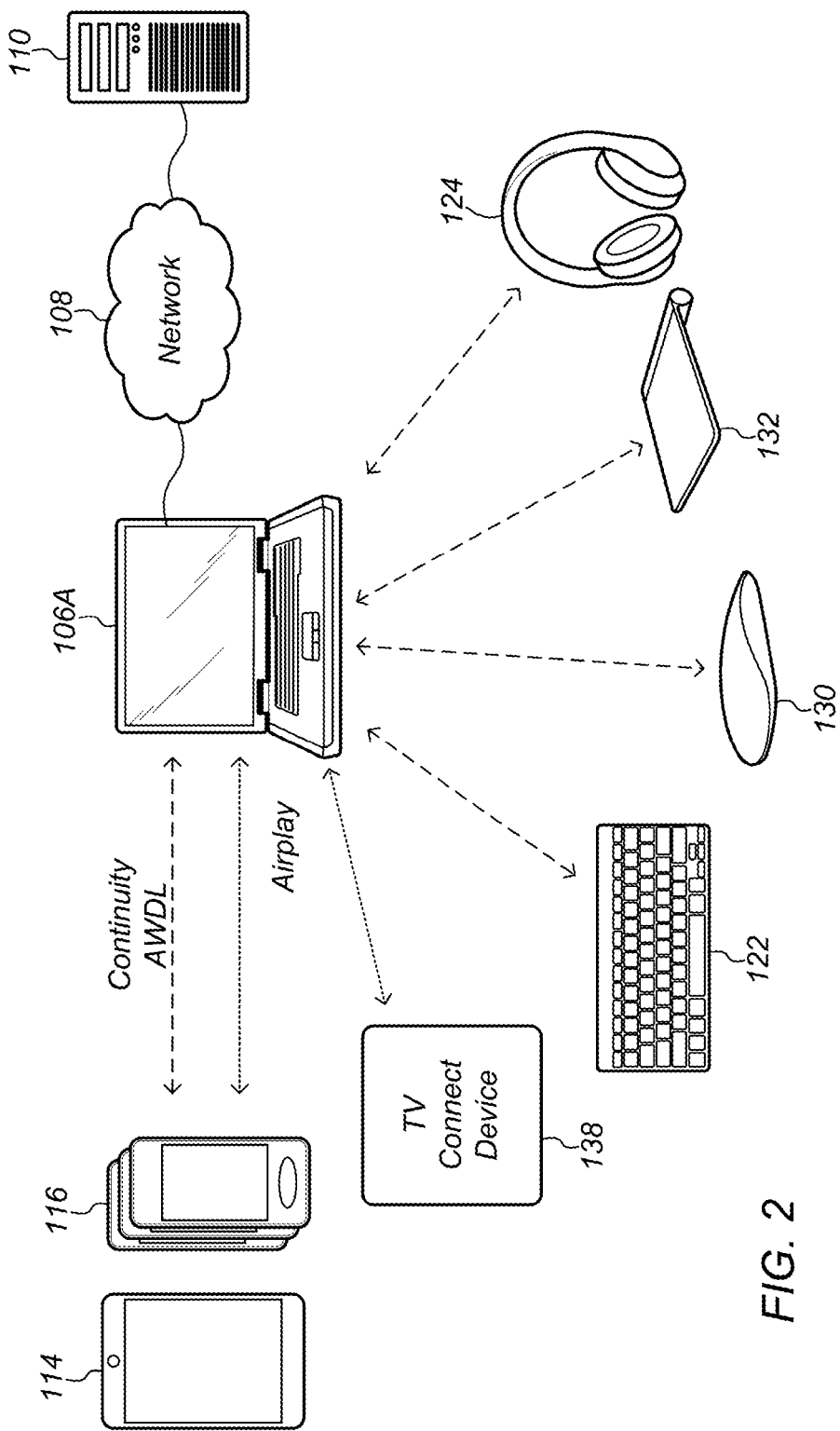
FIG. 2 shows an example wireless communication system in which a first computer system connects over BLUETOOTH™ and Wi-Fi to various other devices, according to some embodiments.

FIG. 2—Example First Computer System Connecting to BT Devices

FIG. 2 illustrates an example where the first device 106 may be a computer system. Thus FIG. 2 shows an example of a first computer system 106A connected to one or more of various types of wireless devices. In this example embodiment, the first computer system 106A may connect to a wireless mouse 130, wireless keyboard 122, wireless trackpad 132, and/or wireless headphones/earbuds/speaker 124. In addition, the first computer system 106A may establish communications over a wide area network 108, such as the Internet, using any of various communication technologies, such as Wi-Fi, cellular, or a wired connection, and may also communicate via network 108 communicate with a remote device/server 110 (for example). Furthermore, computer system 106A may wirelessly connect to a streaming device 138 (e.g. AppleTV™), and may connect with various mobile devices such as tablets 114 and cellular phones 116. Overall, it should be noted that the first device 106 (such as computer device 106A) may connect over a WPAN to any one or more of the devices enumerated above, and any other similar devices equipped, for example, with short range wireless communication interfaces, e.g. BT and the like.

Figure 3:
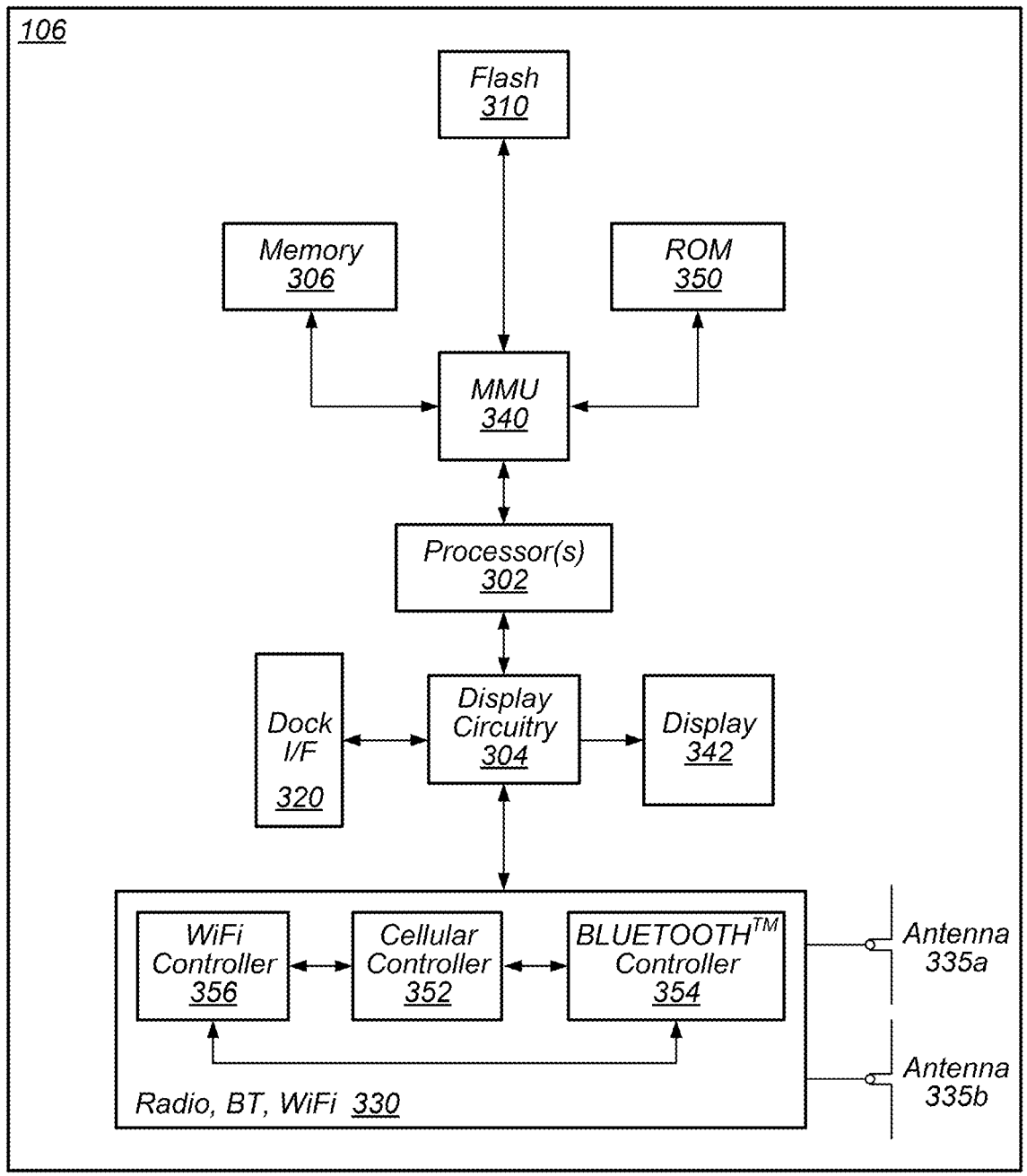
FIG. 3 is a block diagram illustrating an example user device according to some embodiments.

FIG. 3—Example Block Diagram of a Device

FIG. 3 illustrates an exemplary block diagram of a device 106, such as the first device 106 in FIG. 1 and/or computer device 106A in FIG. 2. As shown, the device 106 may include processor(s) 302, which may execute program instructions for the device 106 and may comprise display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310) and/or to other circuits or devices, such as the display circuitry 304, radio 330, connector I/F 320, and/or display 342. The MMU 340 may be configured to perform memory protection and page table translation or set up. In some embodiments, the MMU 340 may be included as a portion of the processor(s) 302.

As shown, the processor 302 may be coupled to various other circuits of the device 106. For example, the device 106 may include various types of memory, a connector interface 320 (e.g., for coupling to the computer system), the display 342, and wireless communication circuitry (e.g., for Wi-Fi, BLUETOOTH™, LTE, LTE-A, GPS, etc.). The device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include more antennas. Overall, the one or more antennas are collectively referred to as antenna 335. For example, the device 106 may use antenna 335 to perform the wireless communication with the aid of radio 330. As noted above, the UE may be configured to communicate wirelessly using multiple wireless communication standards in some embodiments.

As described further subsequently herein, the device 106 may include hardware and software components for implementing improved methods for pairing and connecting with accessory devices. For example, the device of a user may store and execute a wireless software driver (e.g., a BLUETOOTH™ protocol stack), or other software, for providing link information associated with an accessory device to a server to be shared with other devices associated with the user. The device 106 may be configured to implement part or all of the methods described herein, e.g., by executing program instructions stored on a memory medium (e.g., a non-transitory computer-readable memory medium) and/or through hardware or firmware operation. In other embodiments, the methods described herein may be at least partially implemented by a programmable hardware element, such as an FPGA (Field Programmable Gate Array), and/or as an ASIC (Application Specific Integrated Circuit). Thus the device 106 may be configured to implement methods according to any of various embodiments disclosed herein.

In some embodiments, radio 330 may include separate controllers dedicated to controlling communications for various respective RAT standards. For example, as shown in FIG. 3, radio 330 may include a Wi-Fi controller 356 and a BLUETOOTH™ controller 354, and may also comprise a cellular controller (e.g. LTE controller) 352. In some embodiments, one or more or all of these controllers may be implemented as hardware, software, firmware or some combination thereof. While three separate controllers are illustrated within radio 330, other embodiments may have fewer, more, and/or different controllers for various different RATs that may be implemented in device 106.

It should also be noted that any of the accessory devices exemplified in FIG. 2 may also include certain components described in FIG. 3 as components of first device 106. For example, a headset accessory device (e.g. 124 in FIG. 2) may include radio circuitry for short range wireless communications, e.g. a BLUETOOTH™ controller such as controller 354 shown in FIG. 3, in addition to various other components particular to the functionality and purpose of the accessory device (e.g. speakers, transducers, etc.).

Figure 4:
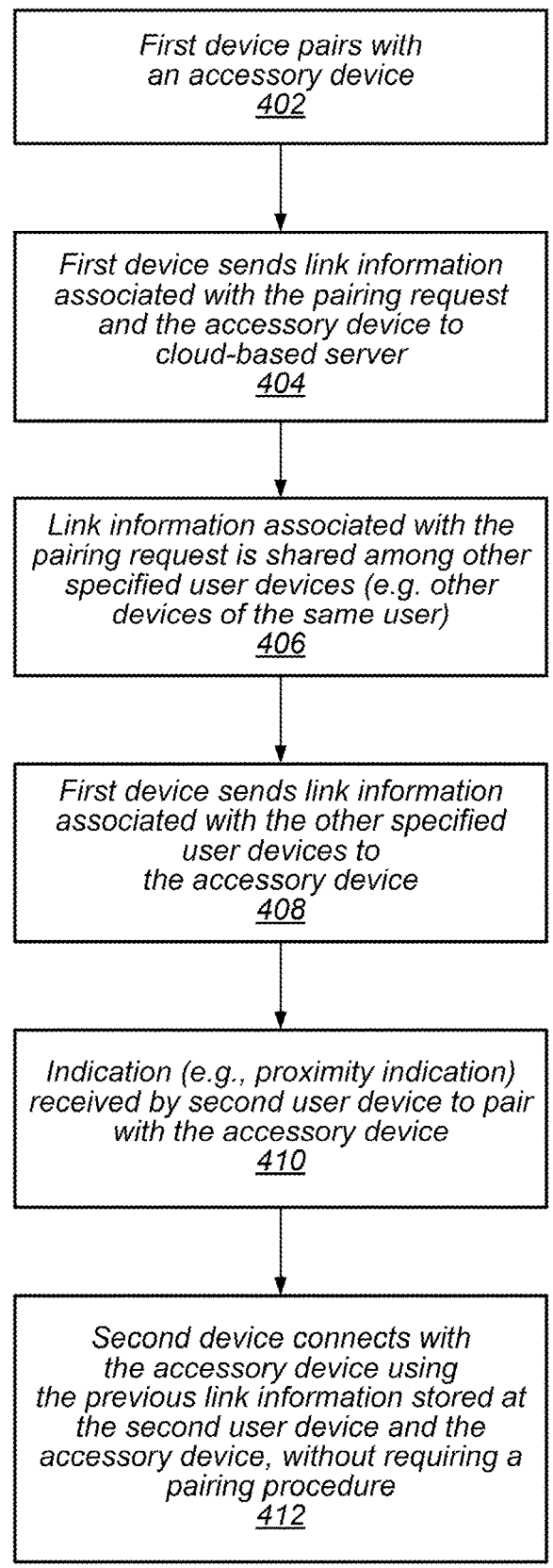
FIG. 4 is a flowchart illustrating an example method by which an accessory device switches from being paired with a first device to being paired with a second device, according to some embodiments.

FIG. 4—Accessory Device Sharing

FIG. 4 shows the flow chart for an example method by which an accessory device may transition from a connection with a first device to connecting to a second device, according to some embodiments. The first device and the second device may be any of various previously enumerated and/or described devices, such as device 106, and in some scenarios may belong to different classes of devices. In some embodiments the first device and second device may also be included in a specified group of devices or a designated set of devices, for example they may be associated with a common user account (e.g., a cloud-based account, such as an iCloud™ account) of a user which may be maintained by a cloud-based server. In other embodiments the devices may be grouped and/or designated as belonging to a group of devices based on another criteria. In general, the devices may be considered as part of a group of devices, e.g. a group of trusted devices. The accessory device may be any of various devices as described above in relation to FIG. 1 and FIG. 2, such as a headset, game controller, mouse, keyboard, wearable, or other similar device, including at least components that facilitate and enable short range wireless communication for pairing with the first device and the second device.

At 402, the first device may pair with the accessory device. In some embodiments, user input on the first device or the accessory device may initiate the pairing or the pairing may occur automatically. For example, the first device may exchange a pairing request with the accessory device for the purpose of establishing a connection between the devices. The accessory device may be able to connect with the first device by one or more of various means, including wired or wireless connections. For example, the accessory device may be a BLUETOOTH™ (BT) device, which may operate to connect to the first device wirelessly, using BT technology. In general, the accessory device may operate to connect to the first device wirelessly, using any of various available WPAN technologies, or short range wireless communications technologies.

At 404 the first device may communicate information associated with the first pairing (or with the first pairing request) to a central location such as a server, e.g. a cloud-based server. The cloud-based server may store respective information associated with various other devices that belong to the specified group of devices into which the first device also belongs, for example devices that all belong to the user of the first device, or are designated as being used by the user of the first device. For example, if the user owns a portable computer, a tablet device and a smart phone, the server (central location) may store respective information associated each of these three devices. The server may also have the ability to communicate, e.g., push, data to each of these three devices. The information (associated with the first pairing) communicated by the first device to the cloud-based server may comprise various items relevant to the accessory device and/or to establishing a connection with the accessory device, such as link keys, addresses, and/or other information. The information may be communicated automatically as a result of the pairing between the first device and the accessory device, or the communication of the information may be triggered by user input on the first device or a request for the information by the cloud-based server. If the first device uses BT to connect to the accessory device, the BT software stack may operate to convey the information to the cloud-based server. The first device may communicate with the cloud-based server by various means, such as wired or wireless connections to the Internet, e.g., using Wi-Fi, LTE, wired Internet, or related technologies. The cloud-based server may store the information and/or distribute the received information among one or more (or all other) devices associated with/belonging to the specified (or designated) group of devices, e.g. devices associated with the user account of the user of the first device. Thus, as shown at 406, the information associated with the accessory device (and the first pairing request) may be propagated from the first device to other devices in the specified group, e.g. to other devices associated with the same user, such as the second device. In some embodiments the second device may then store the information.

The information associated with the pairing (request) of the accessory device and the first device may also be referenced as link information associated with the pairing, and hence include information pertaining to both the accessory device and the first device as associated with the first pairing. Accordingly, the link information may include a first portion pertaining to the first device and a second portions pertaining to the accessory device. For example, the first portion of the link information may include security credentials of the first device, and the second portion of the link information may include security credentials of the accessory device. Furthermore, the first device also may send the link information associated with one or more other user devices (also referred to as second link information) to the accessory device. By providing this (second) link information to the accessory device, the accessory device is enabled to automatically connect (without having to undergo a pairing procedure which may or may not require user intervention) with a second user device of the other specified user devices, using the first link information previously stored at the second user device and the second link information previously stored at the accessory device.

As shown in the flow diagram of FIG. 4, the first device connects with the server (or, more generally, with an external device capable of receiving, storing and sharing information, including the link information, about other devices), to establish what information about other devices is stored on the server (404). However, it should be noted that at any point in time the first device may already have previously received the second link information, and in that case the first device need not be connected to the server as it may already be storing this information. In other words, the first device may already have stored link information associated with (or corresponding to) the one or more other user devices, and may use this locally stored history to create the connection credentials for the one or more other devices. Accordingly, 404 may not need to take place and be omitted in such scenarios.

At 410, certain conditions and/or actions may trigger an indication for the second user device to pair with the accessory device. For example, in some embodiments, the second device may determine its proximity to the accessory device. Proximity between the second device and the accessory device may be calculated using various metrics, such as signal strength, and may be compared to a threshold value to determine whether to initiate proximity-based pairing. In case of proximity-based pairing, if the accessory device is determined to be at least within specified proximity of the accessory device, at 412 the second device may automatically connect with the accessory device (without requiring a pairing procedure) or may present the user with an option to pair the second device to the accessory device, e.g., by prompting the user with a pop-up UI inquiring whether to connect to the accessory device, as desired. The distance used to trigger pairing or connecting can be set as any desired or specified distance. In some implementations, the proximity may be set to a distance determined to be a distance at which pairing/connecting is expected. User input on the second device, e.g., through user interaction with buttons and/or a display, may indicate a desire to pair with the accessory device. Alternately, the second user device may simply connect with the accessory device using the previously stored link information (at both the second user device and at the accessory device as described above) without requiring any user interaction and/or without requiring any multi-step pairing procedure.

As mentioned above, at 412 the second user device may operate to pair with the accessory device in response to the indication received at 410. As the accessory device may already be actively paired with the first device, the second device may communicate a disconnect message to the first device (e.g., over the Internet or through the cloud-based server) for the purpose of transitioning the accessory device from the first user device to the second user device. In some implementations, the accessory may alternatively communicate the disconnect message. The second user device may use the information received at 404/406, such as link key information associated with the accessory device, in order to connect with the accessory device. Similarly, the accessory device may use the information received at 408, such as link key information associated with the second user device, in order to connect with the second user device. This enables the second user device and the accessory device to more easily and efficiently connect with each other without requiring a pairing procedure. Thus, the accessory device may disconnect from the first user device and may establish a new connection with the second user device.

Figure 5:
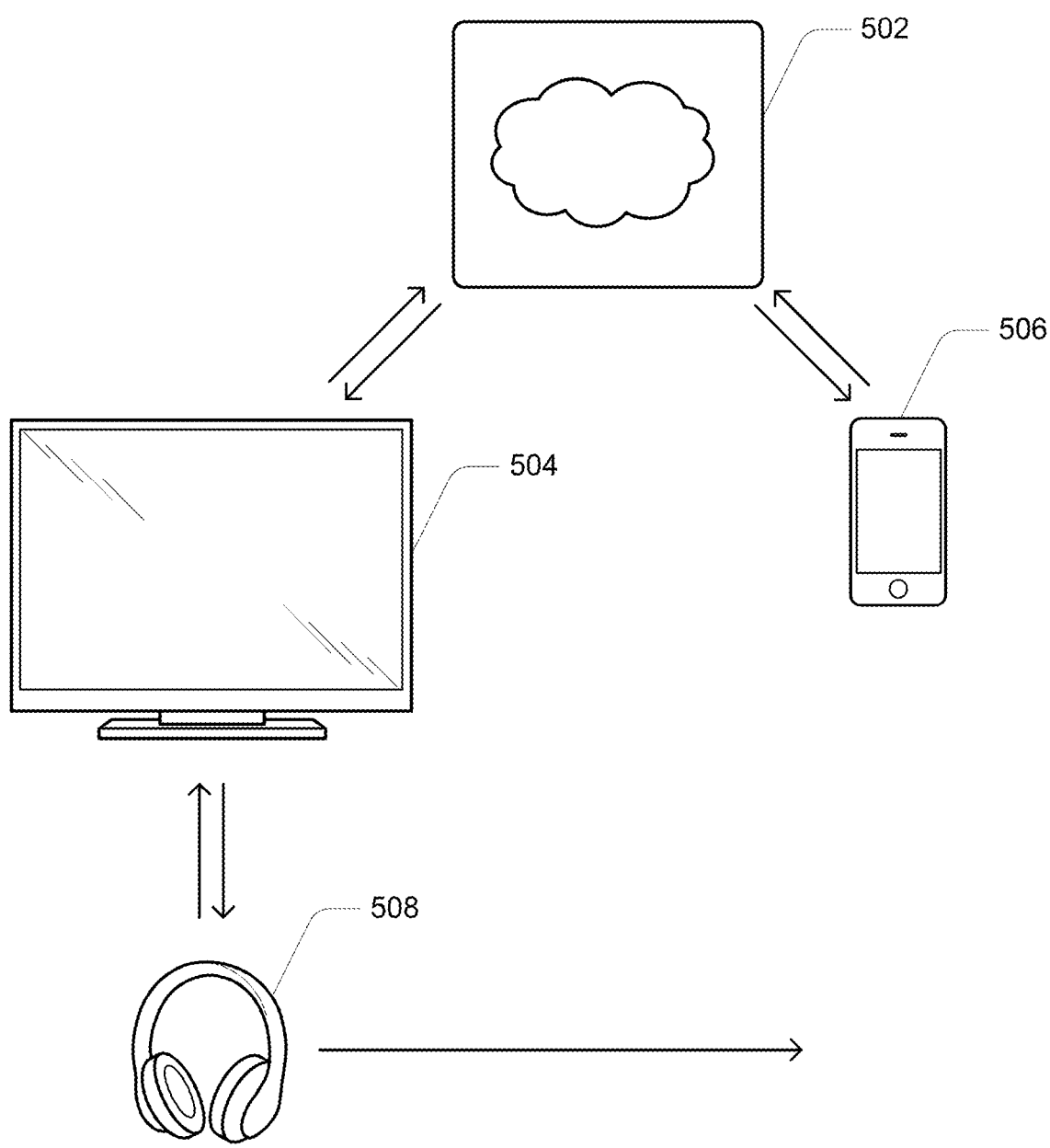
FIG. 5 shows an example communication system in which an accessory device is wirelessly connected to a first user device according to some embodiments.
Figure 6:
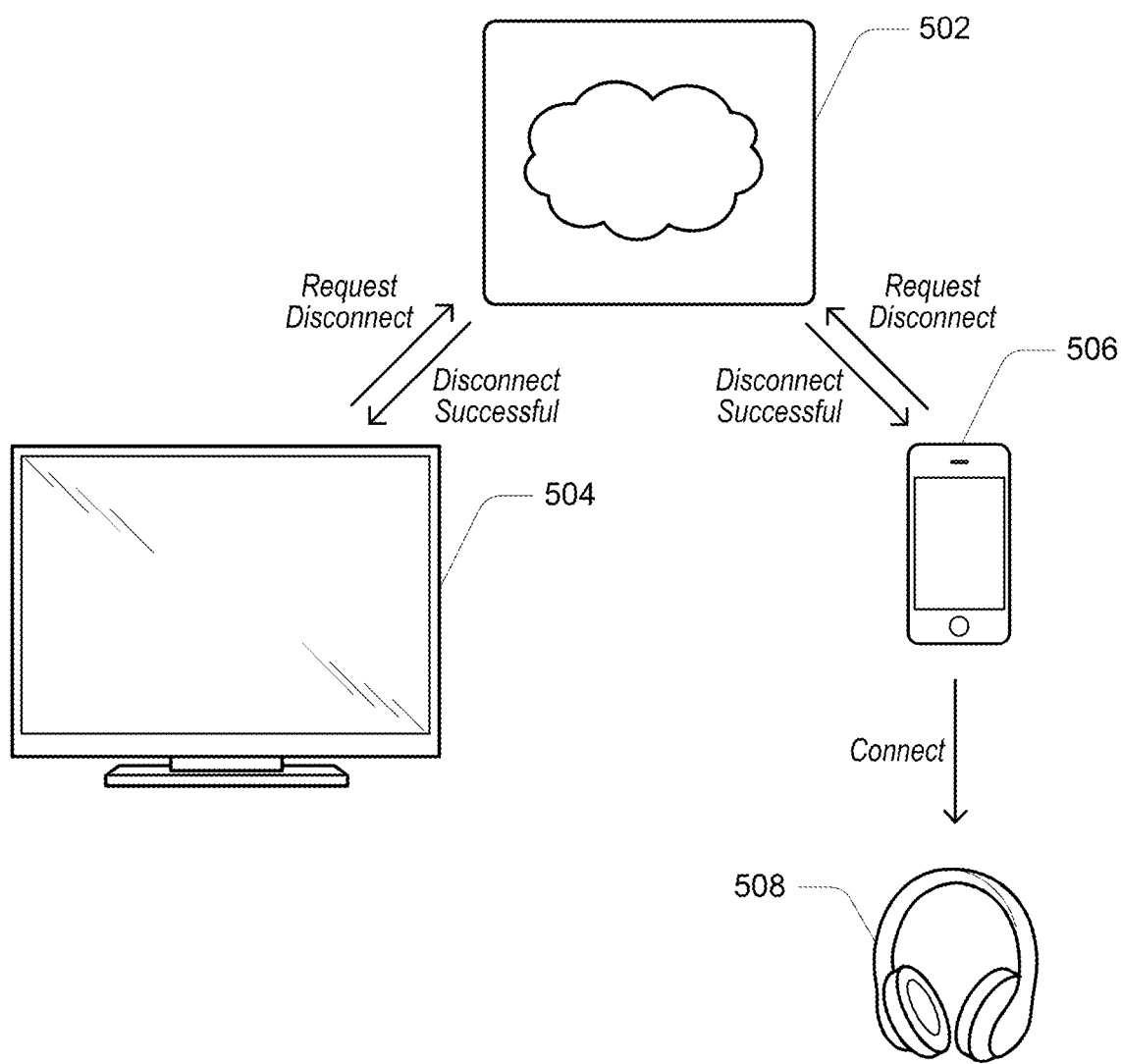
FIG. 6 shows the communication system from FIG. 5, in which the accessory device is disconnected from the first user device and become wirelessly connected to a second user device according to some embodiments.

FIGS. 5 and 6 provide an illustration of how the pairing process described in FIG. 4 may be used to connect user devices to accessory devices via short range wireless communications according to one set of embodiments. As shown in FIG. 5, when a user pairs an accessory device 508, shown here as a headset, via BLUETOOTH™ (BT) to any one of the user's registered devices, shown here as a computer 504, e.g. an iMac™, the device, e.g., through the BT stack, may opt to send the link information associated with the pairing (of user device 504 with accessory device 508) via the cloud 502 to other devices in the user's registered account. As an example, a second user device 506 is shown in FIG. 5 as a smart phone. If any of the other user devices, e.g. user device 506, intend to use the accessory device 508, then the link information, e.g. link keys, may be relayed to the accessory device 508 from the currently connected device 504. Then, as shown in FIG. 6, when the accessory device 508 is moved into pairing proximity range of the second user device 506, the disconnect message may be sent over the cloud 502 to the currently connected device 504, enabling proximity switching. Accordingly, accessory device 508 may be connected with second user device 506 using the link information associated with second user device 506 that had been provided to the accessory device 508 and the link information associated with accessory device 508 that had been provided to second user device 506. Thus, the technique obviates the need for a more lengthy pairing process, either automatic or manual, that requires an exchange—one or both ways—of link information (e.g. keys).

Figure 7:
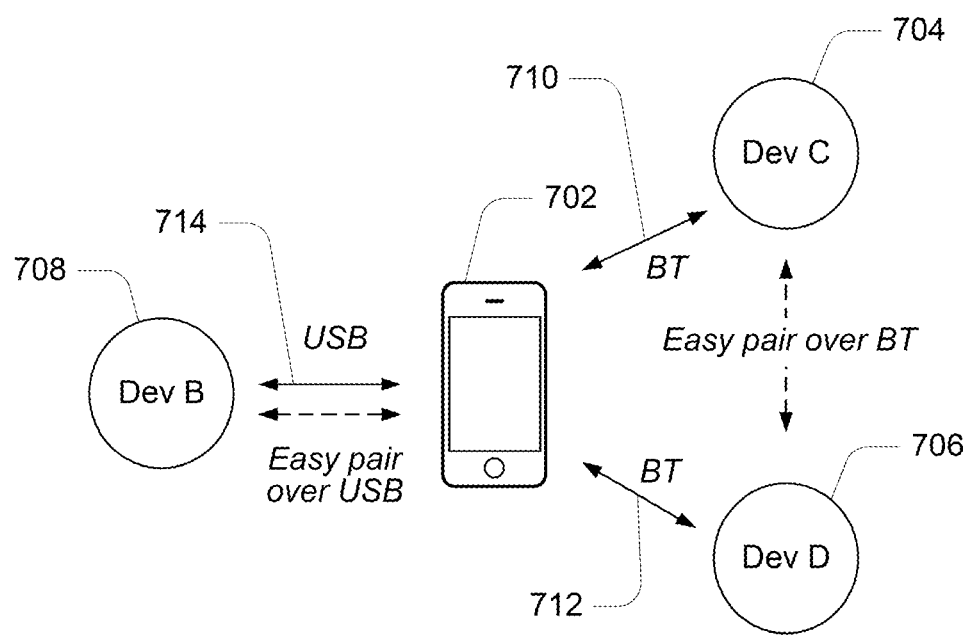
FIG. 7 shows an example communication system in which various devices are interconnected through wired and wireless connections, according to some embodiments.

FIG. 7 shows a communications system with devices connected and paired according to some other embodiments. More specifically, FIG. 7 provides an illustration of the types of wired and wireless connections that may be established in order to allow user devices and accessory devices to be easily connected and/or paired with each other, respectively. A user device 702 and an accessory device 708 may be connected over a secure transport such as USB 714 (shown) or secure Wi-Fi (more generally a secure wired or wireless connection), and the existing transport may be used for exchanging Bluetooth security credentials (more generally link information corresponding to establishing a pairing between the devices according to an insecure and/or short range wireless communication protocol) between devices 702 and 708. In case a BLUETOOTH™ connection (or more generally a connection or pairing according to an insecure and/or short range wireless communication protocol) is desired between more than two devices, device 702 that has a connection with devices 704 and 706 may act as a relay to transfer BLUETOOTH™ security credentials (more generally link information corresponding to establishing a pairing between the devices according to the insecure and/or short range wireless communication protocol) over the existing BLUETOOTH™ (or more generally the insecure and/or short range wireless communication protocol) connections to bring up the third connection between devices 704 and 706 without devices 704 and 706 having to go through a pairing procedure.

Some embodiments of the system shown in FIG. 7 may include a hand held device 702 connected to both a first type of accessory device 704 and to a second type of device 706, for example a wearable device 706. The existing BLUETOOTH™ (BT) connection(s) 710 and 712 may be used to exchange BT security credentials of the first type of accessory device 704 and the wearable device 706 between the first type of accessory device 704 and the wearable device 706. Devices 704 and 706 may then connect with each other under certain conditions without requiring a pairing procedure. In another example, a hand held device 702 may be connected to a display device 708 (e.g. a CarPlay™ device) over USB using an iAP™ protocol. The existing USB connection may be used to exchange BT security credentials and automatically connect the hand held device 702 and the display device 708. In yet another example, a hand held device may be connected to a second type of accessory device over a secure Wi-Fi connection. The existing Wi-Fi connection may be used to exchange BT security credentials and automatically connect the hand held device and second type accessory devices.

Easy Pairing Procedure

Pursuant to the above, the following may be performed to facilitate pairing as described, for example, in FIGS. 4, 5, 6, and 7. First, a pairing type may be determined. Based upon the device types and application, one of a number of different types of pairings may be selected/identified. A first type of pairing may be pairing using a link key. This pairing method may be used for classic pairing between BR/EDR (Basic Rate/Enhanced Data Rate) devices or dual mode devices, where link key is generated on one device and sent to other device for easy pairing. A second type of pairing may be pairing using long term key. This pairing method may be used for LE (Low Energy) pairing between two dual mode devices or LE devices, where LTK (Long Term Key) and other LE pairing related keys are generated on both devices and then exchanged with one another. A third type of pairing may be pairing using OOB (Out of Band) data. This pairing method may be used when either of the above methods are not possible to select for application specific reason. When this pairing type is selected, OOB keys (e.g. as defined by OOB association model in BLUETOOTH™ core spec 2.1 and later) may be generated and exchanged over OOB transport.

Second, device information discovery may be performed. The OOB transport may be used to read device specific information for the devices which are desired to be BT paired. Accordingly, the following data may be retrieved over OOB transport: the BT address of the device, BT device name of the device, and COD (class of device) of the device (when device is BR/EDR or dual mode device). Third, a link key may be generated. An application running on the user device side may provide the remote device information and pairing type to the BT stack and may request to generate security keys for the specific pairing type. Fourth, the link keys may be exchanged. The generated security keys may be exchanged over existing non-BT transport and stored in the respective security database.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processor configured to cause a wireless device to:
determine that the wireless device is in proximity to an accessory device, wherein the wireless device has not previously paired with the accessory device; and
establish a direct connection with the accessory device, in response to determining that the wireless device is in proximity to the accessory device, without engaging in a pairing procedure with the accessory device by using a first item of link information associated with the accessory device, wherein the first item of link information was previously received by the wireless device from a second device different from the accessory device.

2. The apparatus of claim 1, wherein the wireless device and the second device are included in a set of devices associated with a common user.

3. The apparatus of claim 1, wherein the processor is configured to further cause the wireless device to:
receive a disconnect message to disconnect from the accessory device when the accessory device is within at least a specified proximity of a third device, to allow the accessory device to connect to the third device.

4. The apparatus of claim 1, wherein the first item of link information comprises at least one of:
security credentials;
a link key;
a long term key; or
an out-of-band key.

5. The apparatus of claim 1, wherein being in proximity to the accessory device includes one or more of:
being within effective communication range of the accessory device;
being within several meters of the accessory device; or
being within at least a specified distance of the accessory device.

6. The apparatus of claim 1, wherein the processor is configured to further cause the wireless device to:
determine that the wireless device is in proximity to the accessory device by performing proximity calculations based on one or more specified metrics.

7. The apparatus of claim 6, wherein the one or more specified metrics include signal strength, and wherein the processor is configured to further cause the wireless device to determine that the wireless device is in proximity to the accessory device by comparing results of the proximity calculations to a threshold value.

8. The apparatus of claim 1, wherein the processor is configured to further cause the wireless device to display a user interface indication in response to determining that the wireless device is in proximity to the accessory device, wherein the user interface indication presents a user of the wireless device with an option to establish the direct connection with the accessory device.

9. A wireless device comprising:
a radio interface configured to enable wireless communications of the wireless device according to a specified wireless protocol with at least one or more accessory devices; and
a processor communicatively coupled to the radio interface and configured to cause the wireless device to:
determine that the wireless device is in proximity to an accessory device, wherein the wireless device has not previously paired with the accessory device; and
establish a direct connection with the accessory device, in response to determining that the wireless device is in proximity to the accessory device, without engaging in a pairing procedure with the accessory device by using a first item of link information associated with the accessory device, wherein the first item of link information was previously received by the wireless device from a second device different from the accessory device.

10. The wireless device of claim 9, wherein the processor is configured to further cause the wireless device to:
receive a disconnect message to disconnect from the accessory device when the accessory device is within at least a specified proximity of a third device, to allow the accessory device to connect to the third device.

11. The wireless device of claim 9, wherein the first item of link information comprises at least one of:
security credentials;
a link key;
a long-term key; or
an out-of-band key.

12. The wireless device of claim 9, wherein being in proximity to the accessory device includes one or more of:
being within effective communication range of the accessory device;
being within several meters of the accessory device; or
being within at least a specified distance of the accessory device.

13. The wireless device of claim 9, wherein the processor is configured to further cause the wireless device to:
determine that the wireless device is in proximity to the accessory device by performing proximity calculations based on one or more specified metrics.

14. The wireless device of claim 13, wherein the one or more specified metrics include signal strength, and wherein the processor is configured to further cause the wireless device to determine that the wireless device is in proximity to the accessory device by comparing results of the proximity calculations to a threshold value.

15. The wireless device of claim 9, wherein the processor is configured to further cause the wireless device to display a user interface indication in response to determining that the wireless device is in proximity to the accessory device, wherein the user interface indication presents a user of the wireless device with an option to establish the direct connection with the accessory device.

16. A non-transitory memory element storing instructions executable by a processor to cause a wireless device to:
determine that the wireless device is in proximity to an accessory device, wherein the wireless device has not previously paired with the accessory device; and
establish a direct connection with the accessory device, in response to determining that the wireless device is in proximity to the accessory device, without engaging in a pairing procedure with the accessory device by using a first item of link information associated with the accessory device, wherein the first item of link information was previously received by the wireless device from a second device different from the accessory device.

17. The non-transitory memory element of claim 16, wherein the instructions are executable by the processor to further cause the wireless device to:
receive a disconnect message to disconnect from the accessory device when the accessory device is within at least a specified proximity of a third device, to allow the accessory device to connect to the third device.

18. The non-transitory memory element of claim 16, wherein the first item of link information comprises at least one of:
security credentials;
a link key;
a long-term key; or
an out-of-band key.

19. The non-transitory memory element of claim 16, wherein being in proximity to the accessory device includes one or more of:
being within effective communication range of the accessory device;
being within several meters of the accessory device; or
being within at least a specified distance of the accessory device.

20. The non-transitory memory element of claim 16, wherein the instructions are executable by the processor to further cause the wireless device to determine that the wireless device is in proximity to the accessory device by:
performing proximity calculations based on signal strength; and
comparing results of the proximity calculations to a threshold value.

* * * * *